United States Patent
Luo et al.

(10) Patent No.: US 10,017,679 B1
(45) Date of Patent: Jul. 10, 2018

(54) PLUGGING AGENT FOR IMPROVING FORMATION BEARING CAPACITY AND PREPARATION METHOD THEREOF

(71) Applicant: Southwest Petroleum University, Chengdu (CN)

(72) Inventors: Pingya Luo, Chengdu (CN); Dachuan Liang, Chengdu (CN); Pingquan Wang, Chengdu (CN); Mingyi Deng, Chengdu (CN); Jinjun Huang, Chengdu (CN); Yang Bai, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 15/858,711

(22) Filed: Dec. 29, 2017

(30) Foreign Application Priority Data

Nov. 7, 2017 (CN) .......................... 2017 1 1085773

(51) Int. Cl.
| | |
|---|---|
| *C09K 8/42* | (2006.01) |
| *C04B 28/02* | (2006.01) |
| *C04B 24/34* | (2006.01) |
| *C04B 22/14* | (2006.01) |
| *C04B 20/00* | (2006.01) |
| *C04B 24/38* | (2006.01) |
| *C04B 22/10* | (2006.01) |
| *C04B 14/06* | (2006.01) |

(52) U.S. Cl.
CPC .............. *C09K 8/426* (2013.01); *C04B 14/06* (2013.01); *C04B 20/0048* (2013.01); *C04B 22/10* (2013.01); *C04B 22/142* (2013.01); *C04B 24/34* (2013.01); *C04B 24/383* (2013.01); *C04B 28/02* (2013.01); *C09K 2208/04* (2013.01); *C09K 2208/08* (2013.01)

(58) Field of Classification Search
None
See application file for complete search history.

(56) References Cited

U.S. PATENT DOCUMENTS

| 4,514,409 A | * | 4/1985 | Jager | A01N 43/50 514/383 |
|---|---|---|---|---|
| 5,158,613 A | * | 10/1992 | Sargeant | C04B 18/146 106/721 |
| 2005/0051327 A1 | * | 3/2005 | Vinegar | E21B 36/02 166/256 |
| 2009/0000184 A1 | * | 1/2009 | Garwood | B01F 7/00875 44/307 |
| 2009/0200027 A1 | * | 8/2009 | Kakadjian | B01F 17/0085 166/270.1 |
| 2012/0247762 A1 | * | 10/2012 | Pei | C08L 23/06 166/278 |
| 2017/0260444 A1 | * | 9/2017 | Gupta | C09K 8/685 |

FOREIGN PATENT DOCUMENTS

| CN | 102453472 | * | 10/2010 |
| EP | 1977079 | * | 8/2008 |

* cited by examiner

*Primary Examiner* — Melvin C. Mayes
*Assistant Examiner* — Colette Nguyen
(74) *Attorney, Agent, or Firm* — Calfee, Halter & Griswold LLP

(57) ABSTRACT

The present invention relates to the field of reagents for oil and gas wells, and discloses a plugging agent for improving bearing capacity and a preparation method of the plugging agent, wherein, the plugging agent contains water, bridging granules, packing granules, and a cementing material, and, based on 100 parts by weight of water, the content of the bridging granules is 3-15 parts by weight, the content of the packing granules is 5-23 parts by weight, and the content of the cementing material is 4-11 parts by weight. The plugging agent in the present invention can improve the bearing capacity of the formation during well plugging, is applicable to shielded temporary plugging against serious leakage loss during extra-deep well drilling, has efficient and quick plugging performance, and is especially applicable to plugging against serious leakage loss in a formation where the well depth is greater than 3,000 m and conventional plugging agents can't attain a satisfactory plugging effect.

12 Claims, No Drawings

PLUGGING AGENT FOR IMPROVING FORMATION BEARING CAPACITY AND PREPARATION METHOD THEREOF

CROSS REFERENCE TO RELATED APPLICATIONS

This application is a continuation of and claims priority to Chinese Application No. 201711085773.4, filed on Nov. 7, 2017, which is specifically and entirely incorporated herein by reference.

FIELD OF THE INVENTION

The present invention relates to the field of reagents for oil and gas wells, in particular to a plugging agent for improving formation bearing capacity and a preparation method of the plugging agent.

BACKGROUND OF THE INVENTION

The technical mechanism of conventional bridge plugging for improving the bearing capacity of the formation usually is to composite a variety of bridge plugging materials into plugging slurry; utilize high pressure to press the plugging slurry to leakage loss positions in the formation, so that the bridge plugging materials adhere to, bridge up, and pack up the pore throats and form a packing layer that will not be pushed away because the packing layer has high friction with the wall surfaces of the fractures or pores; and then utilize the thin and smooth flake materials that may be curved and deformed easily in the plugging slurry to pack up the pores and utilize plant fibers to brace and link up the materials to form a dense packing layer, so as to attain the purposes of plug up the pores, eliminate leakage loss, and improve the bearing capacity of the formation. The functional mechanism includes the following aspects:
(1) Throat plugging effect: the bridge plugging materials utilize their volume to form bridges at the throats in fractures (pores), and thereby turn fractures into pores and turn large pores into small pores;
(2) Packing effect: the granules in different sizes pack up the remaining spaces, so as to reduce and eliminate the leakage loss channels and thereby attain the purpose of eliminating well leakage;
(3) Infiltration effect: since many bridge plugging materials that may cause high filtrate loss are added in the drilling fluid, the drilling fluid may have high filtrate loss easily and form thick filter cakes, which enhance the plugging effect;
(4) Bracing and linking effect: the fibrous and flaky plugging materials attain a bracing and linking effect, and thereby brace and link up the packing layer firmly and greatly increase the strength of the filter cakes; as a result, the resultant packing layer is hard to move in the leakage fractures and the firmness of the packing layer is increased;
(5) Water swelling effect: some of the bridge plugging materials have certain water swelling capability; when those materials are pressed into the formation fractures and form a bridge bedding layer, they are soaked in the liquid in the formation and thereby swell; thus, the plugging capability of the bridge bedding layer is enhanced.

Conventional bridge plugging materials are mainly inert materials, and may be in granular shape, flake shape, and strip shape, etc. Common granular materials include walnut shells and rubber granules, etc., they plug the "throats" of leakage channels in the plugging process and attain a "bridging" effect, and are also referred to as "bridging agents" accordingly; strip materials are from plants, animals, minerals, and a series of synthetic fiber materials, such as sawdust and asbestos, etc., they attain a suspension effect in the plugging slurry and interlace and brace each other in the plugging layer, and are referred to as "suspending and bracing agents" accordingly; flaky materials include vermiculite and mica sheets, etc., they mainly attain a packing effect in the plugging process, and are referred to as "packing agents" accordingly.

There is no uniform specification for the granules size of conventional bridge plugging materials. Usually, granular materials are classified into three grades, i.e., coarse, medium, and fine granules, wherein, coarse granules are within the range of 4-10 meshes, medium granules are within the range of 10-20 meshes, and fine granules are higher than 20 meshes. Flaky materials usually shall be sieved through a 4-mesh sieve to prevent them from sealing up the bit port. Flexible flaky materials may be in a size as high as 25.4 mm, Flaky materials shall have certain water resistance performance; the strength of a flaky material shall not be decreased by a half or more after the flaky material is soaked in water for 24 h; flaky materials shall not be broken after they are folded repeatedly at the same position; flaky materials with high flexibility may have thickness up to 0.25 mm.

A composite bridge plugging material is a plugging material prepared by compositing several bridge plugging materials at a certain ratio. Common composite plugging materials including rubber granular composite plugging agent, FDJ composite plugging agent, HD composite plugging agent, and cotton seed hull plugging agent, etc. The rubber composite plugging agent is a new bridge plugging agent, and is composited from 35% rubber granules, 20% walnut shells, 15% oyster shell powder, 10% sawdust, 12% cotton seed hulls, 5% peanut hulls, and 3% rice straws. The FDJ composite plugging agent is a composite plugging agent developed utilizing inert rigid plugging materials as the main materials, inorganic salts as reinforcing agents, and polymers as assistant agents. The HD composite plugging agent is composited from walnut shells, mica, rubber, vermiculite, cottonseed hulls, sawdust, and coir fibers at a ratio of 3:2:3:2:1:1:0.1. The cotton seed hull plugging agent is a granular composite plugging agent composited from cotton seed hull powder, cotton seed hull granules, bentonite, asbestos, and surfactant. After the plugging agent is pressed into the formation, it begins to absorb water in a large quantity after a while, and thereby swells and breaks, accumulates at the pore throats, and seals the leakage channels, so that the purpose of plugging is attained.

However, the above-mentioned conventional bridge plugging technique has a series of problems, including instable performance and low bearing capacity, etc., when it is used in deep well or extra-deep well applications. Consequently, once a serious leakage loss situation is encountered during the drilling of a deep well or extra-deep well, the difficulty in handling the situation will be increased, and the cost will be severely increased. Therefore, it is urgent task to see for a plugging agent that is suitable for plugging against serious leakage loss in deep wells or extra-deep wells.

SUMMARY OF THE INVENTION

To overcome the above-mentioned drawbacks in the prior art, the present invention provides a plugging agent for improving formation bearing capacity and a preparation method of the plugging agent. The plugging agent can improve the formation bearing capacity of the formation during well plugging, is applicable to shielded temporary plugging against serious leakage loss during extra-deep well drilling, has efficient and quick plugging performance, and is especially applicable to plugging against serious leakage loss in a formation where the well depth is greater than 3,000 m and conventional plugging agents can't attain a satisfactory plugging effect.

To attain the above-mentioned object, in a first aspect, the present invention provides a plugging agent, which contains water, bridging granules, packing granules, and a cementing material, and, based on 100 parts by weight of water, the content of the bridging granules is 3-15 parts by weight, the content of the packing granules is 5-23 parts by weight, and the content of the cementing material is 4-11 parts by weight.

Preferably, based on 100 parts by weight of water, the content of the bridging granules is 5-12 parts by weight, the content of the packing granules is 10-20 parts by weight, and the content of the cementing material is 5-10 parts by weight.

Preferably, based on 100 parts by weight of water, the content of the bridging granules is 8-10 parts by weight, the content of the packing granules is 14-16 parts by weight, and the content of the cementing material is 8-9 parts by weight.

Preferably, the bridging granules are quartz sand A and/or quartz sand B; preferably, the bridging granules are a mixture of the quartz sand A and the quartz sand B, and, based on 100 parts by weight of bridging granules, the content of the quartz sand A is 30-50 parts by weight, and the content of the quartz sand B is 50-70 parts by weight;

More preferably, the granule size of the quartz sand A is 58-75 μm, and the granule size of the quartz sand B is 18-25 μm.

Preferably, the packing granules are one or more of walnut shells, oyster shells, and nuts;

Preferably, the granule size of the walnut shells is 3-12 μm; the granule size of the oyster shells is 8-17 μm; the granule size of the nuts is 10-19 μm.

Preferably, the cementing material is a material having three-dimensional mesh structures, which is formed by mixing and processing a fiber material and a bio-gum; preferably, the bio-gum is xanthan gum; the fiber material is one or more of natural fiber material, inorganic fiber material, and synthetic fiber material.

Preferably, the plugging agent further contains barite; preferably, the barite is a mixture of barite A and barite B, and, based on 100 parts by weight of barite, the content of the barite A is 130-150 parts by weight, and the content of the barite B is 150-170 parts by weight; More preferably, the granule size of the barite A is 25-38 μm, and the granule size of the barite B is 0.5-1 μm.

In a second aspect, the present invention provides preparation method of the above-mentioned plugging agent, which comprises: mixing the water with the bridging granules, the packing granules, and the cementing material sequentially under a stirring condition.

Preferably, the method comprises: mixing the water with the bridging granules, the packing granules, the cementing material, and the barite sequentially under a stirring condition. Preferably, the stirring condition includes: 7,000-10,000 rpm stirring rate, preferably 8,000-9,000 rpm stirring rate.

With the technical scheme described above, the plugging agent provided in the present invention can improve the formation bearing capacity of the formation during well plugging, and attains the following beneficial effects: After fiber materials mingled at different sizes are mixed and processed with bio-gum, under a high-speed stirring action, they can be dispersed disorderly and uniformly in cement slurry and form stable three-dimensional mesh structures. The fibers have rough surfaces and plasticity, and, assisted with the bonding effect of the bio-gum, the fibers can easily capture the materials in the suspension liquid, including bridging granules, packing granules, and barite, etc., and form stable structures; then, the fibers intertwine with each other to form mesh bridging structures and can bear pressure to a certain extent. At this point, the granules in the cement slurry pack up the tiny pores plugged by the fibers and form a thin but dense plugging layer. Thus, the plugging agent in the present invention is applicable to shielded temporary plugging against serious leakage loss during drilling of an extra-deep well, has efficient and quick plugging performance, and is especially suitable for plugging against serious leakage loss in a formation where the well depth is greater than 3,000 m and conventional plugging agents can't attain a satisfactory plugging effect.

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

The present invention provides a plugging agent, which contains water, bridging granules, packing granules, and a cementing material, and, based on 100 parts by weight of water, the content of the bridging granules may be 3-15 parts by weight, the content of the packing granules may be 5-23 parts by weight, and the content of the cementing material may be 4-11 parts by weight.

According to the present invention, the object of the present invention can be attained to some extent as long as the plugging agent contains water, the bridging granules, the packing granules, and the cementing material and the proportions of those constituents are in line with the above-mentioned proportional relation.

The inventor of the present invention has found in the research: though the object of the present invention can be attained as long as the plugging agent contains water, bridging granules, packing granules and a cementing material and the proportions of the constituents are in line with the above-mentioned proportional relation, preferably, based on 100 parts by weight of water, the content of the bridging granules is 5-12 parts by weight, the content of the packing granules is 10-20 parts by weight, and the content of the cementing material is 5-10 parts by weight, in order to attain a better effect; more preferably, based on 100 parts by weight of water, the content of the bridging granules is 8-10 parts by weight, the content of the packing granules is 14-16 parts by weight, and the content of the cementing material is 89 parts by weight, so as to attain an optimal effect.

According to the present invention, there is no particular restriction on the water. Tap water (clean water) may be used.

According to the present invention, the cementing material is a material having three-dimensional mesh structures, which is formed by mixing and processing a fiber material and a bio-gum.

In the present invention, the bio-gum consists of a main gum (the main constituent is fibrinogen), a catalyst (the main constituent is thrombin), a main gum dissolving solution (sterilized sodium chloride solution), and a catalyst dissolving solution (sterilized calcium chloride solution). The main gum and the catalyst are prepared by separating from healthy pig blood, purification, viral inactivation, and freeze-drying. Both the main gum and the catalyst are white, off-white or straw-yellow opaque solids; after they are dissolved in corresponding dissolving solutions, the solutions are almost colorless or straw yellow or slightly turbid solutions; the two dissolving solutions are colorless and clear liquids. In the present invention, the bio-gum is commercially available. For example, the bio-gum may be purchased from Renqiu Pengyu Chemical Co., Ltd., and the model of it is XC.

In the present invention, the fiber material may be one or more of natural fiber material, inorganic fiber material, and synthetic fiber material, wherein, the natural fiber material may comprise plant fibers and animal fibers; the inorganic fiber material may be asbestos and/or glass fiber material; the synthetic fiber material may be one or more of polyester fiber material, aromatic polyamide fiber material, polyacrylonitrile fiber material, and polypropylene fiber material. Preferably, the length of the fibers may be 2.5-15 cm, and the diameter of the fibers may be 25-85 µm; more preferably, the length of the fibers may be 3.8-7 cm, and the diameter of the fibers may be 45-65 µm.

In the present invention, after fiber materials mingled at different sizes are mixed and processed with bio-gum, under a high-speed stirring action (at 8,000-9,000 rpm stirring rate), they can be dispersed disorderly and uniformly in cement slurry and form stable three-dimensional mesh structures; in addition, the fibers have rough surfaces and plasticity; assisted with the bonding effect of the bio-gum, the fibers can easily capture the materials in the suspension liquid, including bridging granules, packing granules, and barite, etc., and then intertwine with each other in the leakage channels to form mesh bridging structures, which can bear pressure to a certain extent, and have efficient and quick plugging performance.

According to the present invention, the bridging granules may be quartz sand A and/or quartz sand B; preferably, the bridging granules are a mixture of the quartz sand A and the quartz sand B, and, based on 100 parts by weight of bridging granules, the content of the quartz sand A is 30-50 parts by weight, and the content of the quartz sand B is 50-70 parts by weight; more preferably, the bridging granules are a mixture of the quartz sand A and the quartz sand B, and, based on 100 parts by weight of bridging granules, the content of the quartz sand A is 35-45 parts by weight, and the content of the quartz sand B is 55-65 parts by weight; optimally, the bridging granules are a mixture of the quartz sand A and the quartz sand B, and, based on 100 parts by weight of bridging granules, the content of the quartz sand A is 40 parts by weight, and the content of the quartz sand B is 60 parts by weight.

According to the present invention, the granule size of the quartz sand A may be 58-75 µm, and the granule size of the quartz sand B may be 18-25 µm; preferably, the granule size of the quartz sand A may be 65-70 µm, and the granule size of the quartz sand B may be 20-22 µm. In the present invention, by confining the granule sizes of the quartz sand A and the quartz sand B within the ranges described above, the quartz sand A and the quartz sand B can pack up tiny pores in the three-dimensional mesh structures formed by the mixture of the fiber materials and the bio-gum, to form a thin but dense plugging layer and thereby achieve efficient and quick plugging.

According to the present invention, the quartz sand consists of quartz granules formed by milling quartz. Quartz sand is a rigid and wear-resistant silicate mineral with stable chemical properties, and the main mineral constituent of quartz sand is Sift. Quartz sand is in creamy white or colorless translucent, and its hardness is 7. In the building industry, quartz is used to prepare acid-resistant concrete and acid-resistant mortar to utilize the strong acid resistant and medium erosion resistant property of quartz. Quartz can attain a good plugging effect and is a good plugging material.

According to the present invention, the packing granules may be one or more of walnut shells, oyster shells, and nuts; preferably, the packing granules are a mixture of walnut shells, oyster shells, and nuts, and the weight ratio of the walnut shells to the oyster shells to the nuts is 1:(0.3-0.7):(0.3-0.7); more preferably, the granule size of the walnut shells is 3-12 µm; the granule size of the oyster shells is 8-17 µm; the granule size of the nuts is 10-19 µm. In the present invention, by confining the granule sizes of the walnut shells, the oyster shells, and the nuts within the ranges described above, the mixture of them can pack up tiny pores in the three-dimensional mesh structures formed by the mixture of the fiber materials and the bio-gum, to form a thin but dense plugging layer and thereby achieve efficient and quick plugging.

According to the present invention, the plugging agent further contains barite. Barite is the most commonly seen barium mineral, and the constituent of barite is barium sulfate; preferably, the barite is a mixture of barite A and barite B, and, based on 100 parts by weight of barite, the content of the barite A is 130-150 parts by weight, and the content of the barite B is 150-170 parts by weight;

More preferably, the granule size of the barite A is 25-38 µm, and the granule size of the barite B is 0.5-1 µm; optimally, the granule size of the barite A is 30-34 µm, and the granule size of the barite B is 0.6-0.8 µm. In the present invention, by confining the granule sizes of the barite within the ranges described above, the barite can pack up tiny pores in the three-dimensional mesh structures formed by the mixture of the fiber materials and the bio-gum, to form a thin but dense plugging layer and thereby achieve efficient and quick plugging.

In the plugging agent provided in the present invention, the constituents of the plugging agent may be stored separately before the plugging agent is used, i.e., the plugging agent may exist in the form of a plugging agent composition.

In another aspect, the present invention provides preparation method of the plugging agent, which comprises: mixing the water with the bridging granules, the packing granules, and the cementing material sequentially under a stirring condition.

The preparation method according to the present invention may comprise: mixing the water with the bridging granules, the packing granules, the cementing material, and the barite sequentially under a stirring condition.

In the preparation method according to the present invention, the stirring condition includes: 7,000-10,000 rpm stirring rate, preferably 8,000-9,000 rpm stirring rate.

The plugging agent provided in the present invention can improve the bearing capacity of the formation during well plugging, and attains the following beneficial effects: After the fiber materials mingled at different sizes are mixed with the bio-gum and processed, the fibers can form stable three-dimensional mesh structures and can easily capture the materials in the suspension liquid, including bridging granules, packing granules, and barite, etc., and thereby form stable structures; then, the fibers intertwine with each other to form mesh bridging structures in the leakage channels and can bear pressure to a certain extent. At this point, the granules in the cement slurry pack up the tiny pores plugged by the fibers and form a thin but dense plugging layer. Thus, the plugging agent in the present invention is applicable to shielded temporary plugging against serious leakage loss during drilling of an extra-deep well, has efficient and quick plugging performance, and is especially suitable for plugging against serious leakage loss in a formation where the well depth is greater than 3,000 m and conventional plugging agents can't attain a satisfactory plugging effect.

Hereunder the present invention will be detailed in Examples.

The barite and other raw materials are from Guizhou Micropowder Industrial Co. Ltd. (commercial submicron barium sulfate);

The quartz sand is from Jiangsu Zhongsheng silicon Material S&T Co., Ltd., and the model of it is $SiO_2$;

The fiber material is from Shandong Kinnoull Building Material Technology Co., Ltd., and the model of it is PPF;

The bio-gum is from Renqiu Pengyu Chemical Co., Ltd., and the model of it is XC.

Example 1

This Example is provided to describe the plugging agent and the preparation method of the plugging agent provided in the present invention.
100 parts by weight clean water is added into an enamel graduate, a stirrer is started to stir the water at a constant stirring rate, and then the following materials are added sequentially:
4 parts by weight quartz sand A, in 68 μm granule size;
6 parts by weight quartz sand B, in 21 μm granule size;
15 parts by weight packing granules, wherein, the packing granules are a mixture that contains walnut shells, oyster shells, and nuts, the weight ratio of the walnut shells to the oyster shells to the nuts is 1:0.5:0.5, and the walnut shells, the oyster shells and the nuts are in granule size of 8 μm, 14 μm and 16 μm respectively;
9 parts by weight mixture of bio-gum and fiber material, wherein, the mixture of bio-gum and fiber material is prepared by mixing and processing 3 parts by weight bio-gum and 6 parts by weight fiber material;

Wherein, the stirring rate is 8,500 rpm; after the materials are stirred to a homogeneous state, a plugging agent F1 is obtained, and the properties and effect of the plugging agent are shown in Table 1.

Example 2

This Example is provided to describe the plugging agent and the preparation method of the plugging agent provided in the present invention.
100 parts by weight clean water is added into an enamel graduate, a stirrer is started to stir the water at a constant stirring rate, and then the following materials are added sequentially:
4 parts by weight quartz sand A, in 68 μm granule size;
6 parts by weight quartz sand B, in 21 μm granule size;
15 parts by weight packing granules, wherein, the packing granules are a mixture that contains walnut shells, oyster shells, and nuts, the weight ratio of the walnut shells to the oyster shells to the nuts is 1:0.5:0.5, and the walnut shells, the oyster shells and the nuts are in granule size of 8 μm, 14 μm and 16 μm respectively;
9 parts by weight mixture of bio-gum and fiber material, wherein, the mixture of bio-gum and fiber material is prepared by mixing and processing 3 parts by weight bio-gum and 6 parts by weight fiber material;
126 parts by weight barite A, in 32 μm granule size;
84 parts by weight barite B, in 0.7 μm granule size;

Wherein, the stirring rate is 8,500 rpm; after the materials are stirred to a homogeneous state, a plugging agent F2 is obtained, and the properties and effect of the plugging agent are shown in Table 1.

Example 3

100 parts by weight clean water is added into an enamel graduate, a stirrer is started to stir the water at a constant stirring rate, and then the following materials are added sequentially:
4.8 parts by weight quartz sand A, in 68 μm granule size;
7.2 parts by weight quartz sand B, in 21 μm granule size;
20 parts by weight packing granules, wherein, the packing granules are a mixture that contains walnut shells, oyster shells, and nuts, the weight ratio of the walnut shells to the oyster shells to the nuts is 1:0.5:0.5, and the walnut shells, the oyster shells and the nuts are in granule size of 8 μm, 14 μm and 16 μm respectively;
10 parts by weight mixture of bio-gum and fiber material, wherein, the mixture of bio-gum and fiber material is prepared by mixing and processing 3.3 parts by weight bio-gum and 6.7 parts by weight fiber material;
126 parts by weight barite A, in 32 μm granule size;
84 parts by weight barite B, in 0.7 μm granule size;

Wherein, the stirring rate is 8,500 rpm; after the materials are stirred to a homogeneous state, a plugging agent F3 is obtained, and the properties and effect of the plugging agent are shown in Table 1.

Example 4

100 parts by weight clean water is added into an enamel graduate, a stirrer is started to stir the water at a constant stirring rate, and then the following materials are added sequentially:
6 parts by weight quartz sand A, in 68 μm granule size;
9 parts by weight quartz sand B, in 21 μm granule size;
23 parts by weight packing granules, wherein, the packing granules are a mixture that contains walnut shells, oyster shells, and nuts, the weight ratio of the walnut shells to the oyster shells to the nuts is 1:0.5:0.5, and the walnut shells, the oyster shells and the nuts are in granule size of 8 μm, 14 μm and 16 μm respectively;
11 parts by weight mixture of bio-gum and fiber material, wherein, the mixture of bio-gum and fiber material is prepared by mixing and processing 3.6 parts by weight bio-gum and 7.4 parts by weight fiber material;
126 parts by weight barite A, in 32 μm granule size;
84 parts by weight barite B, in 0.7 μm granule size;

Wherein, the stirring rate is 8,500 rpm; after the materials are stirred to a homogeneous state, a plugging agent F4 is obtained, and the properties and effect of the plugging agent are shown in Table 1.

Example 5

A plugging agent is prepared with the method described in the Example 2, but the granule size of the quartz sand A is 60 μm; the granule size of the quartz sand B is 19 μm. After the materials are stirred to a homogeneous state, a plugging agent F5 is obtained, and the properties and effect of the plugging agent are shown in Table 1.

Example 6

A plugging agent is prepared with the method described in the Example 2, but the granule size of the barite A is 36 μm; the granule size of the barite B is 0.9 μm.

After the materials are stirred to a homogeneous state, a plugging agent F6 is obtained, and the properties and effect of the plugging agent are shown in Table 1.

Example 7

A plugging agent is prepared with the method described in the Example 2, but the 9 parts by weight mixture of bio-gum and fiber material is replaced with 10 parts by weight mixture of bio-gum and fiber material.

After the materials are stirred to a homogeneous state, a plugging agent F7 is obtained, and the properties and effect of the plugging agent are shown in Table 1.

Example 8

A plugging agent is prepared with the method described in the Example 2, but the 9 parts by weight mixture of bio-gum and fiber material is replaced with 8 parts by weight mixture of bio-gum and fiber material.

After the materials are stirred to a homogeneous state, a plugging agent F8 is obtained, and the properties and effect of the plugging agent are shown in Table 1.

Comparative Example 1

A plugging agent is prepared with the method described in the Example 2, but the 9 parts by weight mixture of bio-gum and fiber material is replaced with 18 parts by weight mixture of bio-gum and fiber material.

After the materials are stirred to a homogeneous state, a plugging agent D1 is obtained, and the properties and effect of the plugging agent are shown in Table 1.

Comparative Example 2

A plugging agent is prepared with the method described in the Example 2, but the 9 parts by weight mixture of bio-gum and fiber material is replaced with 3 parts by weight mixture of bio-gum and fiber material.

After the materials are stirred to a homogeneous state, a plugging agent D2 is obtained, and the properties and effect of the plugging agent are shown in Table 1.

Comparative Example 3

A plugging agent is prepared with the method described in the Example 2, but the contents of the constituents are different, specifically: 1 parts by weight quartz sand A; 9 parts by weight quartz sand B (in 21 μm granule size); 3 parts by weight packing granules; 2 parts by weight mixture of bio-gum and fiber material.

After the materials are stirred to a homogeneous state, a plugging agent D3 is obtained, and the properties and effect of the plugging agent are shown in Table 1.

Comparative Example 4

A plugging agent is prepared with the method described in the Example 2, but:

The granule size of the quartz sand A is 120 μm;

The granule size of the quartz sand B is 50 μm;

The packing granules are a mixture that contains walnut shells, oyster shells, and nuts, the weight ratio of the walnut shells to the oyster shells to the nuts is 1:0.2:0.2, and the walnut shells, the oyster shells and the nuts are in granule size of 15 μm, 22 μm and 25 μm respectively;

The mixture of bio-gum and fiber material is prepared by mixing and processing 7 parts by weight bio-gum and 2 parts by weight fiber material;

The granule size of the barite A is 98 μm;

The granule size of the barite B is 21 μm.

A conventional HTHP tester is used to evaluate the bearing and plugging performance of the above plugging agents for improving formation bearing capacity. Specifically, the testing method is as follows:

Fracture morphologies are simulated in an indoor environment, to compare the plugging effects of the plugging agents against fracture leakage loss at different leakage loss rates in a drilling process.

Specifically:

The instrument used in the test is DL-A fracture plugging tester;

The simulated fracture is in size of 1.5 mm×1.5 mm.

500 mL test slurry is poured into a tank in the plugging tester, a top cover is screwed onto the tank to seal the tank, nitrogen is charged into the tank via a top gas valve to increase the pressure in the tank at 1 MPa/30 min. gradient, and the leakage condition at a bottom filtrate outlet is observed to judge the plugging effect of the test slurry.

TABLE 1

| | Pressure (MPa) | | | | | | |
|---|---|---|---|---|---|---|---|
| | 1 | 2 | 3 | 4 | 5 | 6 | 7 |
| F1 | 13 mL filtrate loss in dropwise form in 30 min. | None | None | None | None | None | None |
| F2 | 8 mL filtrate loss in dropwise form in 30 min. | None | None | None | None | None | None |
| F3 | 18 mL filtrate loss in dropwise form in 30 min. | None | None | None | None | None | None |
| F4 | 23 mL filtrate loss in dropwise form in 30 min. | None | None | None | None | None | None |
| F5 | 16 mL filtrate loss in dropwise form in 30 min. | None | None | None | None | None | None |
| F6 | 20 mL filtrate loss in dropwise form in 30 min. | None | None | None | None | None | None |
| F7 | 8 mL filtrate loss in dropwise form in 30 min. | None | None | None | None | None | None |
| F8 | 8 mL filtrate loss in dropwise form in 30 min. | 2 mL filtrate loss in dropwise form in 30 min. | None | None | None | None | None |

TABLE 1-continued

| | | Pressure (MPa) | | | | | |
|---|---|---|---|---|---|---|---|
| | 1 | 2 | 3 | 4 | 5 | 6 | 7 |
| D1 | 8 mL filtrate loss in dropwise form in 30 min. | None | None | None | None | None | None |
| D2 | 12 mL filtrate loss in dropwise form in 30 min. | 40 mL filtrate loss in dropwise form in 30 min. | All lost | — | — | — | — |
| D3 | All lost | — | — | — | — | — | — |
| D4 | All lost | — | — | — | — | — | — |

Note
the test temperature is 200° C., and the duration of each pressure test is 30 min.

It is seen from the above Examples 1-8, the Comparative examples 1-4, and the data in the Table 1:

In the plugging performance evaluation experiment, by increasing the pressure progressively, the solid granules in the test slurry are pressed into the fracture and thereby attain a plugging effect. F1 is the optimal solution under the same conditions without adding barite. The main function of barite is weighting, so as to increase the density of the slurry. The present invention discloses that barite A and barite B are composited at a specific ratio; since solid granules in different granule sizes can strengthen the internal structures in the test slurry, the effect of F1 is slightly inferior to the effect of F2. The plugging agent F2 for improving bearing capacity prepared in the Example 2 has filtrate loss as low as 8 mL within 30 min. at 1 MPa, and has no filtrate loss any more after the pressure is increased. That indicates the plugging film in a three-dimensional structure formed by the solid granules and the mixture of bio-gum and fiber material in the test slurry is pressed into the fracture under pressure and attains a good plugging effect successfully, and has good bearing capacity because there is no filtrate loss any more as the pressure is increased.

In the Examples 2 (F2), 3 (F3), and 4 (F4), only the quantities of the solid constituents are changed with the defined ranges. In the Examples 5 (F5), 6 (F6), 7 (F7), and 8 (F8), the quantities and granule sizes of the solid constituents are changed within the changed defined in the present invention; therefore, the data in those Examples are only slightly inferior to those in F1, F2, F3 and F4. In F1-F7, some filtrate loss exists at 1 MPa pressure. In F8, the filtrate loss is only 2 mL at 2 MPa pressure, and no filtrate loss occurs in the follow-up pressurization process; that indicates the plugging agent has very good plugging performance; specifically, at the initial stage of pressurization, the solid constituents in the test slurry are pressed into the fracture under the pressure and achieve plugging successfully; in the follow-up process of pressurization to 7 MPa, no filtrate loss occurs; that indicates the bearing capacity is very high.

In D1, the quantity of the mixture of bio-gum and fiber material is greatly increased on the basis of that in F2, but the effect has little difference from that in F2, while the cost is increased. In D2-D4, the quantities and granule sizes of the solid constituents are changed to be beyond the ranges defined in the present invention; the results indicate that all filtrate is lost. That indicates effective plugging structures are not formed owing to inappropriate quantities of solid constituents and inappropriate granule size combinations.

In summary, the plugging agent for improving formation bearing capacity disclosed in the present invention can bestow certain bearing capacity to the formation, is applicable to shielded temporary plugging against serious leakage loss during extra-deep well drilling, has efficient and quick plugging performance, and is especially applicable to plugging against serious leakage loss in a formation where the well depth is greater than 3,000 m and conventional plugging agents can't attain a satisfactory plugging effect.

While the present invention is described above in detail in some preferred embodiments, the present invention is not limited to those embodiments. Various simple variations, including combinations of the technical features in any other appropriate way, can be made to the technical scheme of the present invention within the scope of the technical concept of the present invention, but such variations and combinations shall be deemed as disclosed content in the present invention and falling in the protection scope of the present invention.

The invention claimed is:

1. A plugging agent comprising water, bridging granules, packing granules, a cementing material, and barite mixture of barite A and barite B, wherein, based on 100 parts by weight of the water, the amount of the bridging granules is 3-15 parts by weight, the amount of the packing granules is 5-23 parts by weight, and the amount of the cementing material is 4-11 parts by weight,
wherein the bridging granules are selected from quartz sand A, quartz sand B, and combinations thereof,
wherein the packing granules are selected from walnut shells, oyster shells, nuts, and combinations thereof,
wherein based on 100 parts by weight of barite, the amount of barite A is 50-70 parts by weight, and the amount of barite B is 30-50 parts by weight with the granule size of the barite A is 25-38 µm, and the granule size of the barite B is 0.5-1 µm.

2. The plugging agent according to claim 1, wherein the amount of the bridging granules is 5-12 parts by weight, the amount of the packing granules is 10-20 parts by weight, and the amount of the cementing material is 5-10 parts by weight.

3. The plugging agent according to claim 2, wherein the amount of the bridging granules is 8-10 parts by weight, the amount of the packing granules is 14-16 parts by weight, and the amount of the cementing material is 8-9 parts by weight.

4. The plugging agent according to claim 1 wherein the bridging granules are a mixture of quartz sand A and quartz sand B, and, based on 100 parts by weight of bridging granules, the amount of the quartz sand A is 30-50 parts by weight, and the amount of the quartz sand B is 50-70 parts by weight.

5. The plugging agent according to claim 4, wherein the granule size of the quartz sand A is 58-75 µm, and the granule size of the quartz sand B is 18-25 µm.

6. The plugging agent according to claim 1, wherein the granule size of the walnut shells is 3-12 m; the granule size of the oyster shells is 8-17 m; the granule size of the nuts is 10-19 m.

7. The plugging agent according to claim 1, wherein the cementing material is a material having three-dimensional mesh structures, which is formed by mixing and processing a fiber material and a bio-gum.

8. The plugging agent according to claim 7, wherein the bio-gum is xanthan gum; the fiber material is one or more of natural fiber material, inorganic fiber material, and synthetic fiber material.

9. A method for preparing a plugging agent according to claim 1, comprising: mixing water with bridging granules, packing granules, and cementing material sequentially while stirring.

10. The method according to claim 9 further comprising mixing the barite sequentially while stirring.

11. The method according to claim 9, wherein stirring is performed at 7,000-10,000 rpm.

12. The method according to claim 11, wherein stirring is performed at 8,000-9,000 rpm.

\* \* \* \* \*